United States Patent
Avraham et al.

(10) Patent No.: US 11,853,160 B2
(45) Date of Patent: Dec. 26, 2023

(54) VARIABLE LENGTH ECC CODE ACCORDING TO DATA ENTROPY IN NVME KEY VALUE PAIR DEVICES

(71) Applicant: Western Digital Technologies, Inc., San Jose, CA (US)

(72) Inventors: David Avraham, Even Yehuda (IL); Alexander Bazarsky, Holon (IL); Ran Zamir, Ramat Gan (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/827,193

(22) Filed: May 27, 2022

(65) Prior Publication Data
US 2023/0385146 A1 Nov. 30, 2023

(51) Int. Cl.
*G06F 11/10* (2006.01)
(52) U.S. Cl.
CPC ...... *G06F 11/1044* (2013.01); *G06F 11/1068* (2013.01)
(58) Field of Classification Search
CPC ............. G06F 11/1044; G06F 11/1068; G06F 11/1004; G06F 3/0604; G06F 3/0619; G06F 3/0673; G06F 3/0659
See application file for complete search history.

(56) References Cited

U.S. PATENT DOCUMENTS

2007/0165845 A1* 7/2007 Ye .................. H04L 9/0875 380/30
2016/0041783 A1 2/2016 Choi et al.
2019/0007058 A1 1/2019 Ki et al.
2020/0004971 A1 1/2020 Secatch et al.
2020/0133770 A1 4/2020 Ki

FOREIGN PATENT DOCUMENTS

CN 109783006 B 5/2022

OTHER PUBLICATIONS

Lim et al., IsoKV: An isolation scheme for key-value stores by exploiting internal parallelism in SSD, IEEE 26th International Conference on High performance computing, data and analytics (HiPC), pp. 247 to 256. (Year: 2019).*
Kim, et al., The Key to Value: Understanding the NVMe Key-Value Standard, Live Website, Sep. 1, 2020, SNIA NSF, Networking Storage, 31 pp.

(Continued)

*Primary Examiner* — Shelly A Chase
(74) *Attorney, Agent, or Firm* — PATTERSON + SHERIDAN, LLP; Steven H. VerSteeg

(57) ABSTRACT

A data storage device includes a memory device and a controller coupled to the memory device. The controller is configured to receive key value (KV) pair data, determine an entropy value of the received KV pair data, select an error correction code (ECC) code rate based on the determined entropy value, and program the KV pair data to a codeword (CW). The KV pair data includes a key and a value. The programming includes encoding the KV pair data using the selected ECC code rate. The controller is further configured to aggregate a portion of another KV pair data and the KV pair data and program the aggregated KV pair data to the CW using a selected ECC code rate.

20 Claims, 7 Drawing Sheets

(56) References Cited

OTHER PUBLICATIONS

Adams, NVMe® Base Specification 2.0 Preview, Flash Memory Summit, 2020, NVM Express organization, 20 pp.
Samsung Key Value SSD Enables High Performance Scaling, A Technology Brief by Samsung Memory Solutions Lab, Samsung Electronics, Co. Ltd., 2017, 8 pp.
Martin, et al, NVM Express Technical Proposal for New Feature, Jun. 2020, NVM Express, Inc., 34 pp.

* cited by examiner

| COMMAND | DESCRIPTION |
|---|---|
| DELETE | DELETE THE KEY AND VALUE ASSOCIATED WITH SPECIFIED KEY |
| LIST | LISTS KEYS THAT EXIST IN A KEY VALUE NAMESPACE STARTING AT A SPECIFIED KEY |
| RETRIEVE | RETRIEVE THE VALUE ASSOCIATED WITH A SPECIFIED KEY |
| EXIST | RETURNS A STATUS INDICATING WHETHER A KEY VALUE EXISTS FOR A SPECIFIED KEY |
| STORE | STORES A KEY VALUE TO A KEY VALUE NAMESPACE |

FIG. 2B

| KEY 202 |
|---|
| VALUE 204 |

FIG. 2A

VARIABLE LENGTH ECC CODE ACCORDING TO DATA ENTROPY IN NVME KEY VALUE PAIR DEVICES

BACKGROUND OF THE DISCLOSURE

Field of the Disclosure

Embodiments of the present disclosure generally relate to data storage devices, such as solid state drives (SSDs), and, more specifically, key value (KV) data storage devices optimizing error correction code (ECC) code for variable lengths of KV pair data.

Description of the Related Art

A KV database works by storing a quantity of user data that is associated with a key that is addressable as a complete entity. Examples of user data that can be stored in a KV database may include photos, records, and files. From a host device point-of-view, the photo, the record, or the file may be retrieved using a single key/address, rather than using multiple addresses that include data of the photo, the record, or the file. The data is stored as unstructured data and may be addressed using a key of variable length. Storage space of a memory device may be allocated for KV pair data in increments of bytes, where a length value of the KV pair data is associated with the necessary storage space to store the KV pair data.

Using a KV database in a data storage device may increase the performance of the data storage device. For example, the number of data transfers/second may be improved because the KV pair data to physical storage location translation layer in the host device may be removed. Furthermore, the number of commands over the bus may be reduced since an entire KV pair data may utilize a single transfer. KV pair data allows access to data on a data storage device using a key rather than a block address. Although a KV data storage device may have an increased performance, when compared to non-KV data storage devices, due to simplified processes between the host device and the data storage device, KV pair data may include a large amount of data, such as up to about 4 GB of data. Therefore, decoding stored encoded KV pair data may require a large amount of resources and bandwidth due to the large amount of data that KV pair data may include.

Therefore, there is a need in the art for an improved optimization of an error correction code (ECC) length associated with the KV pair data to improve decoding.

SUMMARY OF THE DISCLOSURE

The present disclosure generally relates to data storage devices, such as solid state drives (SSDs), and, more specifically, key value (KV) data storage devices optimizing error correction code (ECC) code for variable lengths of KV pair data. A data storage device includes a memory device and a controller coupled to the memory device. The controller is configured to receive KV pair data, determine an entropy value of the received KV pair data, select an ECC code rate based on the determined entropy value, and program the KV pair data to a codeword (CW). The KV pair data includes a key and a value. The programming includes encoding the KV pair data using the selected ECC code rate. The controller is further configured to aggregate a portion of another KV pair data and the KV pair data and program the aggregated KV pair data to the CW using a selected ECC code rate.

In one embodiment, a data storage device includes a memory device and a controller coupled to the memory device. The controller is configured to receive key value (KV) pair data, determine an entropy value of the received KV pair data, select an error correction code (ECC) code rate based on the determined entropy value, aggregate a portion of another KV pair data and the KV pair data, and program the aggregated KV pair data to a codeword (CW). The KV pair data includes a key and a value. The programming includes encoding the aggregated KV pair data using the selected ECC code rate.

In another embodiment, a data storage device includes a memory device and a controller coupled to the memory device. The controller is configured to receive a plurality of key value (KV) pair data, determine an entropy value of each KV pair data of the plurality of KV pair data, determine an error correction code (ECC) code rate based on the determined entropy value, and program and encode the plurality of KV pair data using the determined ECC code rate a codeword (CW) of a page of the memory device. The page includes a plurality of codewords (CWs). A parity size at least two CWs of the plurality of CWs is different. A portion of a first KV pair data is stored in a first CW and a remaining portion of the first KV pair data is stored in a second CW.

In another embodiment, a data storage device includes memory means and a controller coupled to the memory means. The controller is configured to determine an entropy value for each key value (KV) pair data of a plurality of KV pair data, determine an error correction code (ECC) code rate for each KV pair data based on the determined entropy value, and program and encode each KV pair data using the determined ECC code rate to one or more codewords (CWs) of a page of the memory means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A is an exemplary illustration of a KV pair data, according to certain embodiments.

FIG. 2B is a table illustrating a command set for a KV database, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, key value (KV) data storage devices optimizing error correction code (ECC) code for variable lengths of KV pair data. A data storage device includes a memory device and a controller coupled to the memory device. The controller is configured to receive KV pair data, determine an entropy value of the received KV pair data, select an ECC code rate based on the determined entropy value, and program the KV pair data to a codeword (CW). The KV pair data includes a key and a value. The programming includes encoding the KV pair data using the selected ECC code rate. The controller is further configured to aggregate a portion of another KV pair data and the KV pair data and program the aggregated KV pair data to the CW using a selected ECC code rate.

Figure 1:
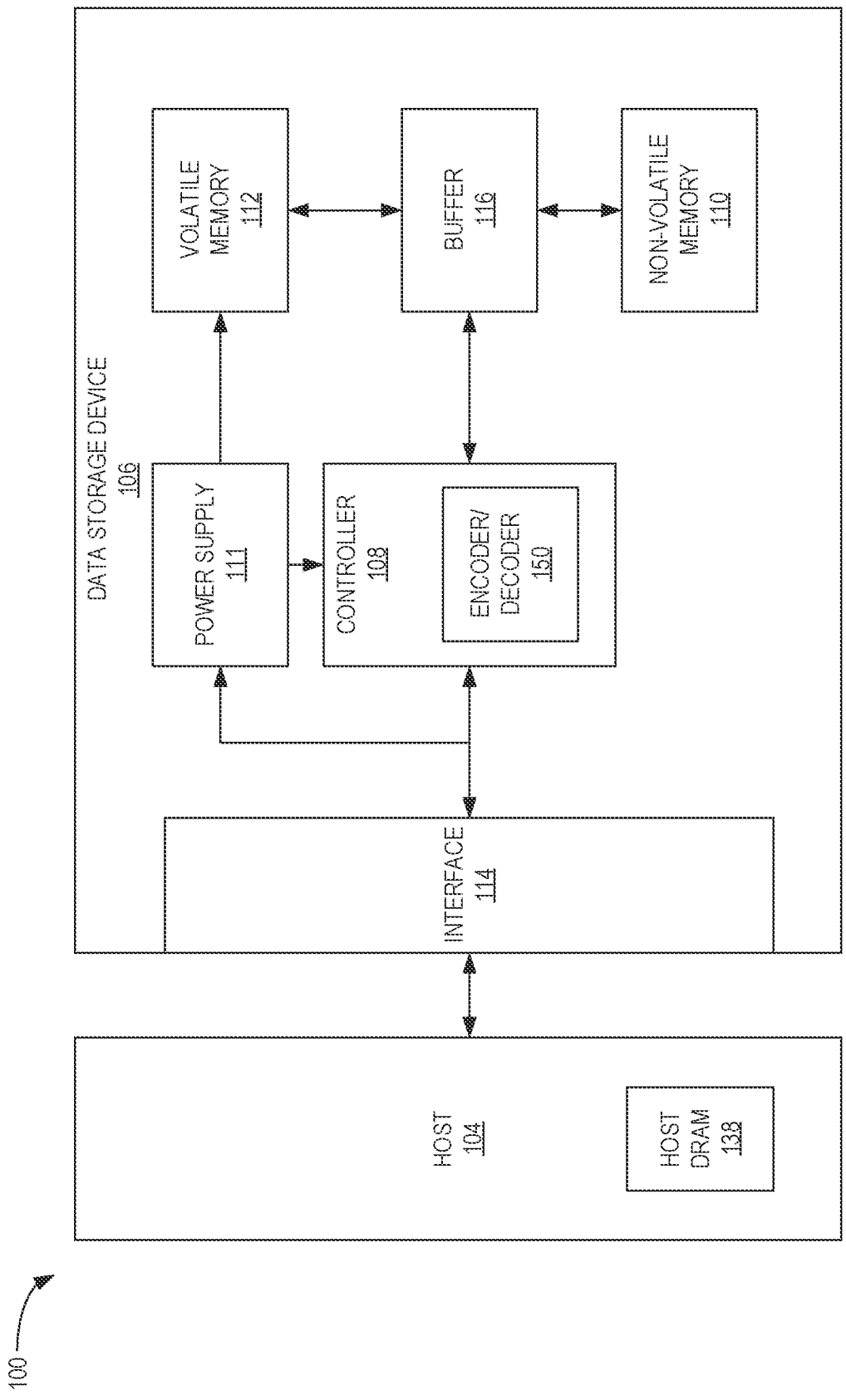
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory, such as SRAM, or in the write buffer 116 before sending the data to the NVM 110.

The controller 108 includes an encoder/decoder 150. It is to be understood that the encoder/decoder 150 may be separate units in the controller 108. The encoder of the encoder/decoder 150 may be configured to encode data to be programmed to the NVM 110 using a determined error correction code (ECC) code rate (i.e., ratio of data to parity data). The ECC code rate may be based on different factors, such as quality of service (QoS) requirements, bandwidth and resource availability, data size, and the like. The decoder of the encoder/decoder 150 may be configured to decode the encoded data received from the NVM 110. The decoding may be completed so that the data may be transferred back to the host device 104 or modified, re-encoded, and re-stored in the NVM 110.

In some examples, the decoder of the encoder/decoder 150 may be an iterative content aware decoder (ICAD). Data that is written to the NVM 110 may have a certain structure. For example, the value of KV pair data may correspond to objects in higher data hierarchy, such that the value may have inherent structures, such as files, journaling, data tables, padded areas, and the like. An ICAD decoder may exploit the fact the data written to the NVM 110 has a certain structure. For example, the bits from the same byte may be statistically dependent, such that knowing part of the bits within a byte provides statistical information of the other bits within the same byte. Thus, by exploiting the pattern, the ICAD decoder (and other methods utilizing similar methods) may have improved correction capability and lower decode latency than conventional decoders, which may improve data storage device 106 performance.

In a KV system, there may be one or more KV formats present, each with a different set of KV sizes and properties. Furthermore, each KV format may have a relative performance (RP) requirement which may dictate where the KV pair data is stored in the NVM 110. It is to be understood that the term "requirement" may refer to a general guideline, such that the controller 108 may attempt to program KV pair data in the RP specified wordlines or blocks, but may also program the KV pair data in adjacent RP groups to the RP requirement. Blocks of the NVM 110 may be classified according to conditions that relate to the health of the block. For example, conditions relating to the health of the block may include, but not limited to, a number of program erase cycles (PEC), a bit error rate (BER) severity, a physical location of a wordline on the block, and an amount of time exceeding a temperature threshold or thresholds. Wordlines near an edge of the block may exhibit higher BER than wordlines near the middle of the block.

Therefore, blocks and/or wordlines of the blocks may be logically grouped into performance groups. For example, there may be four groups where a first group has the highest performance, a second group has a performance lower than the first group, a third group has a performance lower than the second group, and a fourth group has a performance lower than the third group. An example of RP values is shown in Table 1 below.

TABLE 1

| Value | Definition |
|---|---|
| 00b | Best Performance |
| 01b | Better Performance |
| 10b | Good Performance |
| 11b | Degraded Performance |

When storing KV pair data, the value of the KV pair data may be divided between wordlines and blocks of the NVM 110 that have different health properties in order to ensure that overall read throughput is not impaired due to random placement across the blocks. Additionally, prioritization of values may be incorporated. For example, values with a higher RP requirement are placed in blocks that have a first health and values with a lower RP requirement are placed in blocks that have a second health, where the first health is greater than the second health. For example, the first health may be associated with "best performance" or "00b" of Table 1 and the second health may be associated with "better performance" or "01b" of Table 1 above.

FIG. 2A is an exemplary illustration of a KV pair data 200, according to certain embodiments. KV pair data 200 includes a key 202 and a value 204, where the data, which may be host data, of the value 204 is addressed by the key 202. The key 202 may have a size of about 1 byte to about 64 bytes and the value 204 may have a size of about 0 bytes to about $2^{32}-1$ bytes. For example, when the value 204 has a size of about 0 bytes, the value 204 is an empty value. It is to be understood that the previously mentioned values are not intended to be limiting, but to provide an example of an embodiment. Because the value 204 may have a size greater than a physical wordline (e.g., greater than 16 KB), the value 204 may be divided across several wordlines and may result in misalignment. Misalignment may occur when data from multiple values are stored in a single wordline or when a portion of the value 204 is stored partially on a single wordline. Because misalignment of stored data may result in multiple reads, quality of service of a data storage device storing the misaligned data may be decreased and a power consumption of the data storage device may be increased.

FIG. 2B is a table 250 illustrating a command set for a KV database, according to certain embodiments. For exemplary purposes, aspects of the storage system 100 of FIG. 1 may be referenced herein. A KV system may include a command set that includes, in a non-limiting list, a delete command, a list command, a retrieve command, an exist command, and a store command. The delete command may cause the controller 108 to delete the key 202 and value 204 associated with the key 202. The list command may cause the controller 108 to list keys that exist in a KV namespace starting at a specified key. The exist command may cause the controller 108 to return a status indicating whether a KV pair data 200 exists for a specified key to the command generator, such as the host device 104. The store command may cause the controller 108 to store a KV pair data to a KV namespace.

The retrieve command may cause the controller 108 to retrieve the value 204 associated with a specified key from a KV namespace. The length to be retrieved of the KV pair data 200 is specified in the retrieve command and the location to transfer the KV pair data 200 is specified by either a scatter gather list (SGL) pointer or a physical region page (PRP) pointer in the retrieve command. If the specified length in the retrieve command is less than the length of the KV pair data 200 that is being retrieved, then the controller 108 returns the requested amount and the length of the KV pair data 200 to the completion queue. However, if the specified length in the retrieve command is greater than the length of the KV pair data 200 that is being retrieved, then the controller 108 returns the data from the NVM 110 and the length of the KV pair data 200 is returned to the completion queue.

Figure 3:
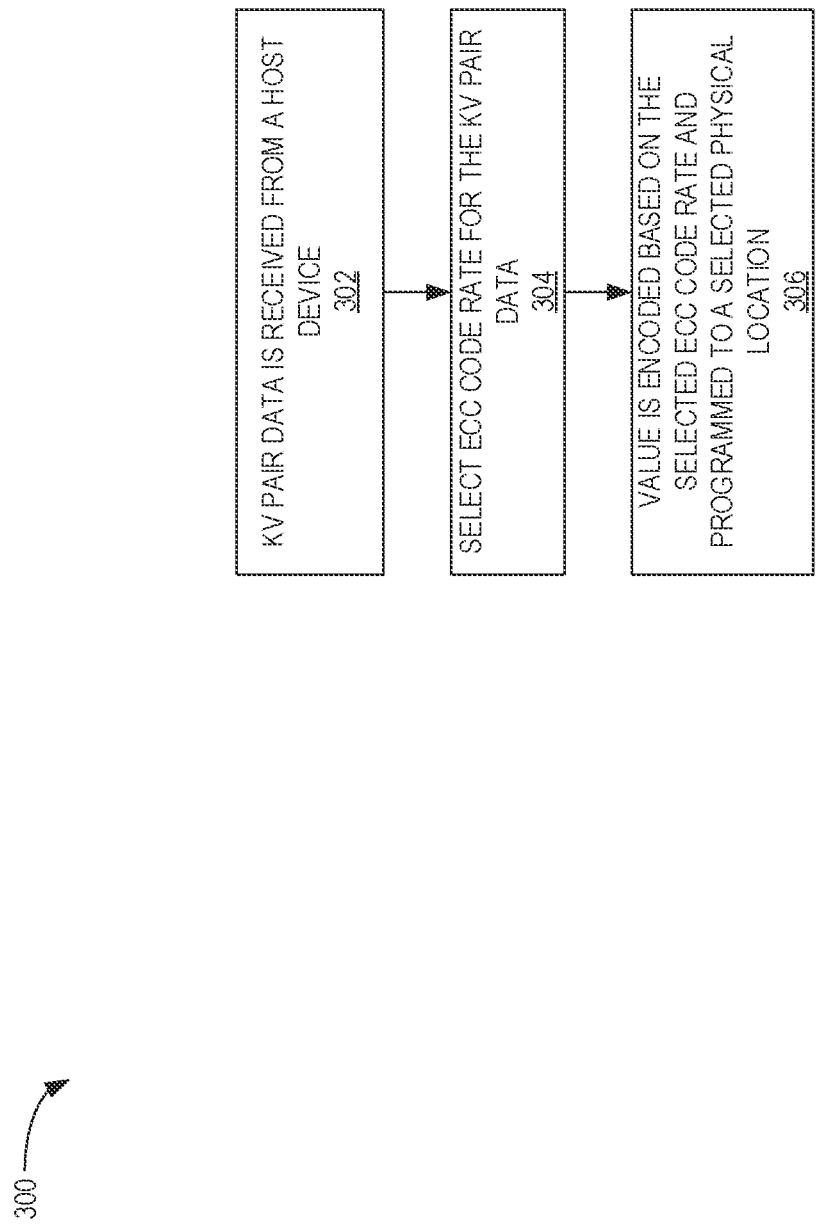
FIG. 3 is a flow diagram illustrating a conventional method of encoding and programming values of KV pair data, according to certain embodiments.

FIG. 3 is a flow diagram illustrating a conventional method 300 of encoding and programming values of KV pair data, according to certain embodiments. Conventional method 300 may be implemented by a controller, such as the controller 108 of FIG. 1. For exemplary purposes, aspects of the storage system 100 of FIG. 1 may be referenced herein.

At block 302, KV pair data is received from the host device 104. The KV pair data includes a value length and/or an RP value. At block 304, the controller 108 selects an ECC code rate for the received KV pair data. The selected ECC code rate may be a generic ECC code rate used for encoding all of the received KV pair data. In other words, the selected ECC code rate is determined without using any of the received KV pair data parameters, such as value length or RP. Thus, the ECC code length may be a fixed ECC code length. At block 306, the encoder of the encoder/decoder 150 encodes the value of the received KV pair data using the selected ECC code rate and the controller 108 programs the value to a selected physical location in the NVM 110.

Figure 4:
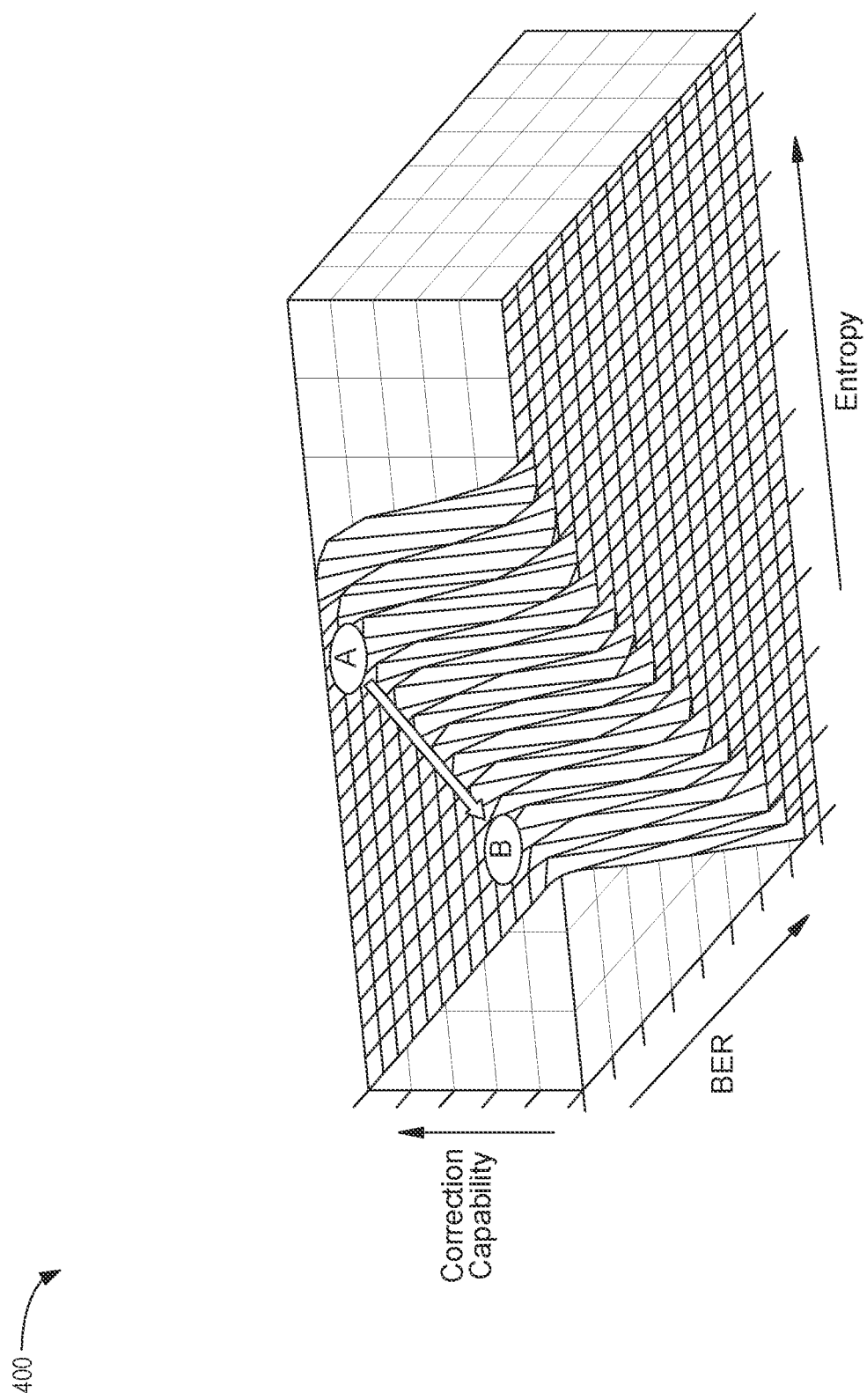
FIG. 4 is an exemplary three-dimensional graph illustrating a correlation between correction capability (z), bit error rate (BER) (x), and entropy (y), according to certain embodiments.

FIG. 4 is an exemplary three-dimensional (3D) graph 400 illustrating a correlation between correction capability (z), bit error rate (BER) (x), and entropy (y), according to certain embodiments. The 3D graph 400 may illustrate the correlation of correction capability (z), bit error rate (BER) (x), and entropy (y) of an ICAD decoder and similar content aware decoders. For ICAD decoders and other similar content aware decoders, correction capability improves as the data has more patterns and regresses to the same correction capability as a conventional decoder as the data becomes more random. The ICAD decoder and similar content aware decoders may determine the entropy of the data. Referring to the 3D graph 400, depending on the entropy and BER, a corresponding correction capability may be inferred. Thus, at higher entropies, lower BER values are preferred to maintain acceptable correction capabilities. Likewise, at higher BER values, lower entropies are preferred to maintain acceptable correction capabilities. When data has lower entropy (i.e., less random), better correction capability may result as there are margins for correction may be greater. In other words, for data that has less entropy or more patterns in the data, lower amounts of parity bits may be allocated to the ECC code, so that the correction capability may still be equal or greater than a conventional decoder.

Figure 5:
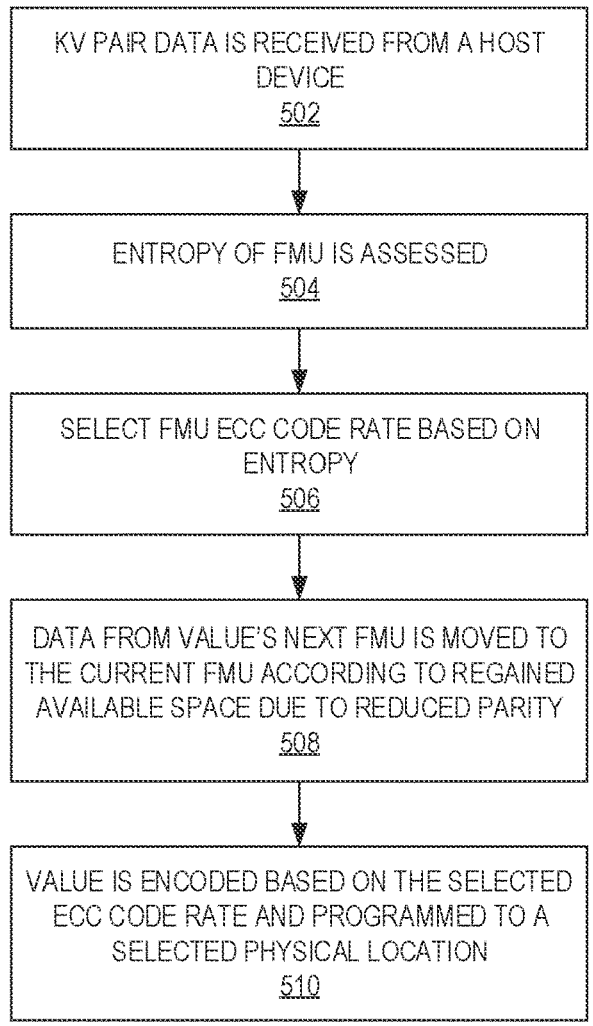
FIG. 5 is a flow diagram illustrating a method of encoding and programming values of KV pair data according to a selected ECC code rate, according to certain embodiments.

FIG. 5 is a flow diagram illustrating a method 500 of encoding and programming values of KV pair data according to a selected ECC code rate, according to certain embodiments. Method 500 may be implemented by a controller, such as the controller 108 of FIG. 1. For exemplary purposes, aspects of the storage system 100 of FIG. 1 may be referenced herein.

At block 502, KV pair data is received from the host device 104. The KV pair data includes a value length and/or an RP value. At block 504, the controller determines the entropy of the value of the KV pair data in flash memory unit (FMU) sizes. At block 506, the controller 108 selects an ECC code rate for each of the FMUs based on the entropy of each FMU of the value. At block 508, the controller 108 moves data from a next FMU to the current FMU based on saved space due to less parity data generated due to the selected ECC code rate. Because the data in values may be typically read sequentially from the beginning of the value to the end of the value, there may not be a need to know which part of the data is in which FMU. In other words, because the value (e.g., host data) may be spread over several FMUs, the only information that may be needed is a starting point and read length (e.g., value length). Therefore, the size of the payload per FMU may change from FMU to FMU. In FMUs that have more host data structure and require less parity, a larger payload can be used to store more of the host data in each FMU. At block 510, each FMU of the value is encoded based on the selected ECC code rate and programmed to the selected physical location of the NVM 110.

Figure 6A:
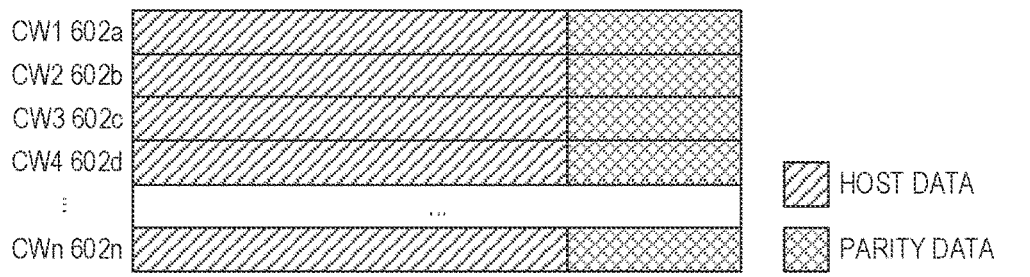
FIGS. 6A-6C are exemplary illustrations of various encoding schemes, according to certain embodiments.
Figure 6B:
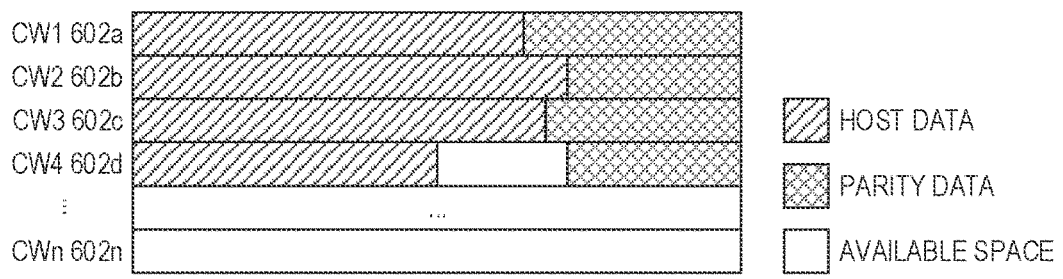
Figure 6C:
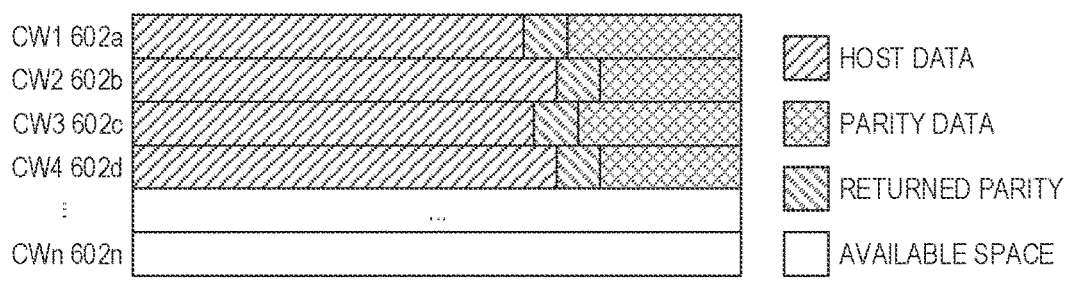

FIGS. 6A-6C are exemplary illustrations of various encoding schemes 600, 630, 660, according to certain embodiments. The first encoding scheme 600 of FIG. 6A shows a plurality of codewords (CWs) 602a-602n. Each of the plurality of CWs 602a-602n includes host data and parity data. As illustrated in the first encoding scheme 600, the parity data size of each of the plurality of CWs 602a-602n are the same. In other words, method 300 may describe the first encoding scheme 600.

However, the second encoding scheme 630 of FIG. 6B and the third encoding scheme 660 of FIG. 6C shows various encoding schemes using the method 500, where the entropy of the value of the KV pair data is analyzed and a selected ECC code rate is determined for each FMU of the value of the KV pair data. As shown in the second encoding scheme 630, the host data and the parity data per codeword varies, such that the encoding scheme may allow for more host data and less parity data to be stored per codeword while maintaining at least a minimum decoding capability (e.g., the decoding capability of a conventional decoder). Thus, because less parity data may be generated and stored, available space (i.e., regained space due to the less parity data needed) may available in a last codeword.

Referring to the third encoding scheme 660 of FIG. 6C, in addition to the saved space in the form of entire CWs, there may some extra space that is free in the last FMU. Therefore, the controller may determine how much extra space the last FMU may have prior to storing the KV pair data to the memory device. The extra space may be distributed evenly between each of the programmed FMUs associated with the KV pair data, such that additional ECC data may be stored with each FMU in order to increase correction capability and reduce decoding latency.

In another embodiment, relevant for longer values, the entropy of the data may be measured for the first few FMUs of the KV pair data and extrapolated to reflect the expected size of the KV pair data (i.e., number of FMUs the KV pair data will take). The estimated value may be used to calculate how many FMUs will be needed to accommodate for the data.

In yet another example, the data size of the value may be fixed, such as in a 4096 bytes size, but the parity data is reduced according to the data structure of the KV pair data. Thus, in cases where each FMU may have extra available space, the extra available space may be used in an opportunistic manner, such as to hold KV metadata (e.g., indexing for text, scale-invariant feature transform (SIFT) features for images, and the like), holding system metadata, shaping the data to generate less stress on the memory device in order to prolong the life of the memory device, and the like.

In yet another embodiment, the FMU parity data may be reduced to a minimum limit of the correction capability given by the low entropy. The remainder of the bytes may be used as a global parity by connecting correction capability between multiple FMUs or adjacent FMUs. Thus, the correction capability of the data may remain the same while using less parity data due to the presence of the global parity data (which may have a larger code length).

Figure 7:
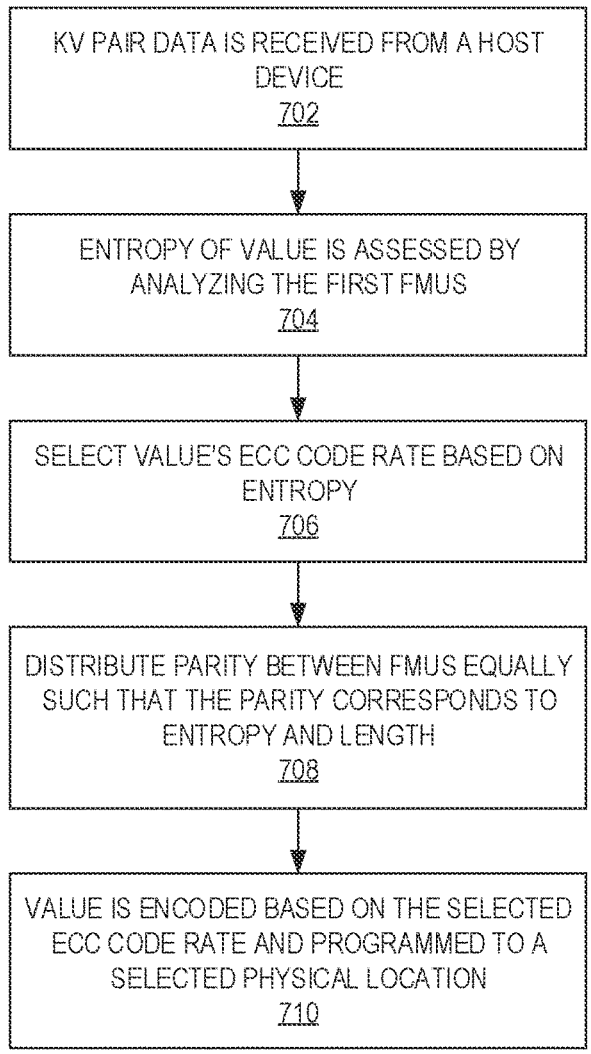
FIG. 7 is a flow diagram illustrating a method of encoding and programming values of KV pair data according to a selected ECC code rate, according to certain embodiments.

FIG. 7 is a flow diagram illustrating a method 700 of encoding and programming values of KV pair data according to a selected ECC code rate, according to certain embodiments. Method 700 may be implemented by a controller, such as the controller 108 of FIG. 1. For exemplary purposes, aspects of the storage system 100 of FIG. 1 may be referenced herein.

At block 702, KV pair data is received from the host device 104. The KV pair data includes a value length and/or an RP value. At block 704, the controller determines the entropy of the first few FMUs of the value of the KV pair data. At block 706, the controller 108 selects an ECC code rate for each of the FMUs based on the determined entropy of the first few FMUs. At block 708, the controller 108 distributes parity data between FMUs equally such that the parity data corresponds to entropy and length of the KV pair data. At block 710, each FMU of the value is encoded based on the selected ECC code rate and programmed to the selected physical location of the NVM 110.

By analyzing an entropy of one or more FMUs of the KV pair data and selecting an ECC code rate based on the entropy of the one or more FMUs of the KV pair data, additional storage space may be regained, which may improve system overprovisioning, reduce program/erase cycles, improve system performance, and reduce system power consumption.

In one embodiment, a data storage device includes a memory device and a controller coupled to the memory device. The controller is configured to receive key value (KV) pair data, determine an entropy value of the received KV pair data, select an error correction code (ECC) code rate based on the determined entropy value, aggregate a portion of another KV pair data and the KV pair data, and program the aggregated KV pair data to a codeword (CW). The KV pair data includes a key and a value. The programming includes encoding the aggregated KV pair data using the selected ECC code rate.

A first amount of parity associated with the KV pair data encoded with the selected ECC code rate is less than a second amount of parity associated with the KV pair data that is encoded with a generic ECC code rate. An amount of freed space of the CW having the programmed KV pair data encoded with the selected ECC code rate has a size equal to a difference in size between the second amount of parity and the first amount of parity. An amount of freed space of the CW having the programmed KV pair data encoded with the selected ECC code rate has a size less than a difference in size between the second amount of parity and the first amount of parity. The amount of freed space is equal to the size of the CW minus the portion of the minus a size of the KV pair data encoded with the selected ECC code rate. The amount of freed space of the CW is used for overprovisioning. The controller is further configured to aggregate a portion of another KV pair data and the KV pair data. The programmed KV pair data is the aggregated KV pair data. The ECC code rate is a ratio of data and parity. A first payload of a first CW is different than a second payload of a second CW. The first payload has a first size of parity data corresponding to one or more KV pair data and the second payload has a second size of parity data corresponding to another one or more KV pair data. The first size of parity data is greater than the second size of parity data.

In another embodiment, a data storage device includes a memory device and a controller coupled to the memory device. The controller is configured to receive a plurality of key value (KV) pair data, determine an entropy value of each KV pair data of the plurality of KV pair data, determine an error correction code (ECC) code rate based on the determined entropy value, and program and encode the plurality of KV pair data using the determined ECC code rate a codeword (CW) of a page of the memory device. The page includes a plurality of codewords (CWs). A parity size at least two CWs of the plurality of CWs is different. A portion of a first KV pair data is stored in a first CW and a remaining portion of the first KV pair data is stored in a second CW.

The programmed plurality of KV pair data has a size less than a size of the CW. A remaining capacity of the CW is used for overhead. The remaining capacity is equal to a capacity of the CW minus a size of the programmed plurality of KV pair data. The overhead comprises global parity data. The global parity data is associated with one or more FMUs of one or more CWs. The controller is further configured to determine an amount of free space in a last CW of the plurality of CWs, redistribute the amount of free space to the plurality of CWs, where the redistributing comprises moving at least the portion of KV pair data of the first CW to the second CW, and program additional parity to the redistributed amount of free space. The first CW includes a plurality of first KV pair data, a first portion of the redistributed amount of free space, and first parity data associated with the plurality of first KV pair data and the second CW includes a plurality of second KV pair data, a second portion of the redistributed amount of free space, and second parity data associated with the plurality of second KV pair data. A size of the plurality of first KV pair data is different than a size of the plurality of second KV pair data. A size of the first portion of the redistributed amount of free space is equal to a size of the second portion of the redistributed amount of free space. A size of the first parity data is different than a size of the second parity data. A size of a plurality of first KV pair data stored in the first CW is equal to a size of a plurality of second KV pair data stored in the second CW. A size of first parity data encoded using the determined ECC code rate and a size of second parity data encoded using the determined ECC code rate is less than a size of the first parity data encoded using a generic ECC code rate and a size of the second parity data encoded using the generic ECC code rate. A remaining capacity of the first CW and the second CW is used to store at least one of KV metadata, data storage device metadata, and/or data shaping.

In another embodiment, a data storage device includes memory means and a controller coupled to the memory means. The controller is configured to determine an entropy value for each key value (KV) pair data of a plurality of KV pair data, determine an error correction code (ECC) code rate for each KV pair data based on the determined entropy value, and program and encode each KV pair data using the determined ECC code rate to one or more codewords (CWs) of a page of the memory means.

The programmed KV pair data including the determined ECC code rate has a first size and the programmed KV pair data including a generic ECC code rate has a second size. A remaining portion of a total capacity of a CW is equal to the second size minus the first size. The controller is further configured to utilize the remaining portion for at least one of additional parity, additional KV pair data, metadata, and/or data shaping.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   receive key value (KV) pair data, wherein the KV pair data comprises a key and a value;
   determine an entropy value of the received KV pair data;
   select an error correction code (ECC) code rate based on the determined entropy value; and
   program the KV pair data to a codeword (CW), wherein programming comprises encoding the KV pair data using the selected ECC code rate.

2. The data storage device of claim 1, wherein a first amount of parity associated with the KV pair data encoded with the selected ECC code rate is less than a second amount of parity associated with the KV pair data that is encoded with a generic ECC code rate.

3. The data storage device of claim 2, wherein an amount of freed space of the CW having the programmed KV pair data encoded with the selected ECC code rate has a size equal to a difference in size between the second amount of parity and the first amount of parity.

4. The data storage device of claim 2, wherein:
   an amount of freed space of the CW having the programmed KV pair data encoded with the selected ECC code rate has a size less than a difference in size between the second amount of parity and the first amount of parity; and
   the amount of freed space is equal to the size of the CW minus a size of the KV pair data encoded with the selected ECC code rate.

5. The data storage device of claim 4, wherein the amount of freed space of the CW is used for overprovisioning.

6. The data storage device of claim 1, wherein the controller is further configured to aggregate a portion of another KV pair data and the KV pair data, and wherein the programmed KV pair data is aggregated KV pair data.

7. The data storage device of claim 1, wherein the ECC code rate is a ratio of data and parity.

8. The data storage device of claim 7, wherein a first payload of a first CW is different than a second payload of a second CW.

9. The data storage device of claim 8, wherein the first payload has a first size of parity data corresponding to one or more KV pair data and the second payload has a second size of parity data corresponding to another one or more KV pair data.

10. The data storage device of claim 9, wherein the first size of parity data is greater than the second size of parity data.

11. A data storage device, comprising:
    a memory device; and
    a controller coupled to the memory device, wherein the controller is configured to:
    receive a plurality of key value (KV) pair data;
    determine an entropy value of each KV pair data of the plurality of KV pair data;

determine an error correction code (ECC) code rate based on the determined entropy value; and program and encode the plurality of KV pair data using the determined ECC code rate a codeword (CW) of a page of the memory device, wherein:

the page includes a plurality of codewords (CWs);

a parity size at least two CWs of the plurality of CWs is different; and a portion of a first KV pair data is stored in a first CW and a remaining portion of the first KV pair data is stored in a second CW.

12. The data storage device of claim 11, wherein the programmed plurality of KV pair data has a size less than a size of the CW.

13. The data storage device of claim 12, wherein a remaining capacity of the CW is used for overhead, and wherein the remaining capacity is equal to a capacity of the CW minus a size of the programmed plurality of KV pair data.

14. The data storage device of claim 13, wherein the overhead comprises global parity data, and wherein the global parity data is associated with one or more FMUs of one or more CWs.

15. The data storage device of claim 11, wherein the controller is further configured to:

determine an amount of free space in a last CW of the plurality of CWs;

redistribute the amount of free space to the plurality of CWs, wherein the redistributing comprises moving at least the portion of KV pair data of the first CW to the second CW; and program additional parity to the redistributed amount of free space.

16. The data storage device of claim 15, wherein the first CW includes a plurality of first KV pair data, a first portion of the redistributed amount of free space, and first parity data associated with the plurality of first KV pair data and the second CW includes a plurality of second KV pair data, a second portion of the redistributed amount of free space, and second parity data associated with the plurality of second KV pair data.

17. The data storage device of claim 16, wherein:

a size of the plurality of first KV pair data is different than a size of the plurality of second KV pair data;

a size of the first portion of the redistributed amount of free space is equal to a size of the second portion of the redistributed amount of free space; and a size of the first parity data is different than a size of the second parity data.

18. The data storage device of claim 11, wherein:

a size of a plurality of first KV pair data stored in the first CW is equal to a size of a plurality of second KV pair data stored in the second CW;

a size of first parity data encoded using the determined ECC code rate and a size of second parity data encoded using the determined ECC code rate is less than a size of the first parity data encoded using a generic ECC code rate and a size of the second parity data encoded using the generic ECC code rate; and a remaining capacity of the first CW and the second CW is used to store at least one of:

KV metadata;

data storage device metadata; and/or data shaping.

19. A data storage device, comprising:

memory means; and a controller coupled to the memory means, wherein the controller is configured to:

determine an entropy value for each key value (KV) pair data of a plurality of KV pair data;

determine an error correction code (ECC) code rate for each KV pair data based on the determined entropy value; and program and encode each KV pair data using the determined ECC code rate to one or more codewords (CWs) of a page of the memory means.

20. The data storage device of claim 19, wherein:

the programmed KV pair data including the determined ECC code rate has a first size and the programmed KV pair data including a generic ECC code rate has a second size;

a remaining portion of a total capacity of a CW is equal to the second size minus the first size; and the controller is further configured to utilize the remaining portion for at least one of additional parity, additional KV pair data, metadata, and/or data shaping.

* * * * *